United States Patent [19]

Janssen

[11] 3,873,763

[45] Mar. 25, 1975

[54] DISK-SHAPED RECORD CARRIER ON WHICH INFORMATION IS RECORDED IN THE FORM OF AN OPTICAL STRUCTURE

[75] Inventor: Peter Johannes Michiel Janssen, Emmasingel, Eindhoven, Netherlands

[73] Assignee: U.S. Philips Corporation, New York, N.Y.

[22] Filed: Mar. 26, 1973

[21] Appl. No.: 344,701

[30] Foreign Application Priority Data

Sept. 2, 1972 Netherlands ...................... 7211998

[52] U.S. Cl..... 178/6.6 R, 178/6.7 A, 179/100.3 V, 179/100.4 M

[51] Int. Cl. ........................ H04n 5/76, G11b 11/00

[58] Field of Search ............ 179/100.4 R, 100.4 M, 179/100.3 V, 100.41 L; 178/6.7 R, 6.7 A, 178/6.6 P, 6.6 R, DIG. 29

[56] References Cited

UNITED STATES PATENTS

| | | | |
|---|---|---|---|
| 1,917,003 | 7/1933 | Williams | 179/100.4 R |
| 1,967,882 | 7/1934 | Hammond | 179/100.3 V |
| 2,034,803 | 3/1936 | Fuller | 179/100.3 V |
| 2,654,810 | 10/1953 | Miessner | 179/100.3 V |
| 3,198,880 | 8/1965 | Toulon | 179/100.3 V |
| 3,688,025 | 8/1972 | Wittemore | 179/100.3 G |
| 3,798,388 | 3/1974 | Dickopp | 179/100.3 V |

*Primary Examiner*—Raymond F. Cardillo, Jr.
*Attorney, Agent, or Firm*—Frank R. Trifari; Simon L. Cohen

[57] ABSTRACT

A record carrier for, for example, video and/or audio information, which information is recorded in an optical structure, and an apparatus for reading the record carrier are described. By means of an additional electrically conducting plate which together with an electrically conducting highly reflecting coating of the optical structure forms a capacitive element the distance by which the image-forming objective system and the optical structure are spaced from one another can be measured.

6 Claims, 4 Drawing Figures

DISK-SHAPED RECORD CARRIER ON WHICH INFORMATION IS RECORDED IN THE FORM OF AN OPTICAL STRUCTURE

The invention relates to a disk-shaped radiation-reflecting record carrier on which information, for example video and/or audio information, is recorded in at least one track which has an optical structure. The invention also relates to an apparatus for reading this record carrier.

It has already been proposed, for example in co-pending U.S. Pat. application Ser. No. 396,399, filed Sept. 12, 1973, which is a continuation of U.S. Pat. application Ser. No. 229,285, filed Feb. 25, 1972 and now abandoned, to provide in the track a reflecting optical structure which is composed of regions of variable length which lie in one plane and are separated by areas which also lie in one plane, the planes being spaced from one another by a constant distance. The lengths of the regions and areas are determined by the recorded information. Thus, the record carrier is spatially frequency modulated along its track.

If the record carrier is circular, it may be provided with one continuous spiral track. Alternatively, a plurality of parallel tracks may be provided on the record carrier. In order to optically modulate a light beam impinging on the tracks the regions and areas have different optical properties, such as coefficient of reflection, although several other known optical properties for distinguishing the regions from the areas may be used.

The record carrier may optically be read by focussing a read beam on the optical structure. The read beam is modulated in time by the record carrier in accordance with the sequence of regions and areas in a track. The modulated read beam is converted by a radiation-sensitive detector into an electric signal from which in known manner, for example, a visible picture or audible sound may be derived.

Owing to, for example, inaccuracies in the supporting system of the record carrier or to warping of the record carrier or to vibrations in the read device the track to be read may move in the axial direction relative to an objective system required to form an image of a small part of the optical structure on the detection system. In this case the detector receives not only radiation from the part of the track to be read, but also radiation from the surroundings of this part. As a result, the modulation depth of the output signal of the detector is reduced, while moreover, because not only one track but also adjacent tracks are illuminated, crosstalk may occur. To avoid these disadvantages the distance from the objective system to the plane of the optical structure must be adjustable.

It is an object of the present invention to generate in a read apparatus a signal which is an indication of the distance between the optical structure on the record carrier and the objective system and enables the objective system to be displaced. According to a first aspect of the invention a record carrier according to the invention is characterized in that at least the part of the record carrier on which information is recorded, is coated with an electrically conducting and optically high-reflecting layer. This layer exactly follows the shape of the optical structure and takes over its function.

According to a second aspect of the invention an apparatus for reading the record carrier, which apparatus is provided with a source of radiation which supplies a read beam and with an objective system for forming an image of the part of the record carrier to be read on a radiation-sensitive detector, which detector converts the read beam modulated by the record carrier into an electric signal, a plate made of an electrically conductive material being secured to the objective system and serving to form, together with the electrically conducting coating of the record carrier, a capacitive element, and which apparatus is furthermore provided with an electronic device for converting the capacitance value of the capacitive element into a signal for controlling the position of the objective system relative to the optical structure of the record carrier, wherein the electronic device is provided with one oscillator and a resonant circuit in which the capacitive element is included and to which the oscillator signal is applied, and that the oscillator is capable of producing at least a signal at a frequency which corresponds to the resonant frequency of the resonant circuit which occurs when the distance between the objective system and the optical structure has the desired value.

The desired distance from the objective system to the optical structure is very small, for example 300 $\mu$m. Hence, for example when a record carrier is placed in the read apparatus and when the read apparatus and hence the capacitive follower system is switched on, the objective system may strike the record carrier. To prevent this, according to the invention the electronic device is provided with means by which, when the record carrier is placed in the read apparatus, the objective system is spaced from the optical structure of the record carrier by a distance which is great compared with the distance used during reading.

In addition, according to the invention the electronic device includes means for gradually reducing the said distance to approximately the distance desired during reading. This prevents the objective system from striking the record carrier owing to hunting in the control circuit for the objective system.

An embodiment of the invention will now be described, by way of example, with reference to the accompanying diagrammatic drawings, in which.

Figure 1:
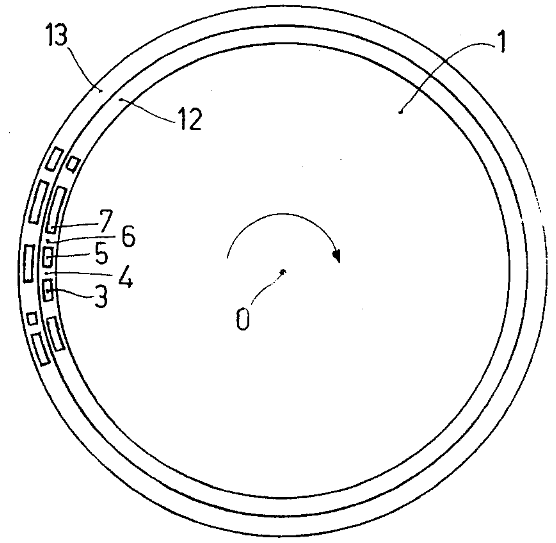
FIG. 1 is a plan view of a record carrier to be read.

Referring now to FIG. 1, there is shown a plan view of part of a record carrier 1. The carrier contains a spiral structure which comprises a large number of quasi-concentric tracks. The tracks may alternatively be concentric, as is shown in FIG. 1. Only parts of two adjacent tracks (designated by 12 and 13) are shown. Each of the tracks contains a crenellated structure the dimensions of which are shown greatly exaggerated in FIG. 2 which is a tangential sectional view of the record carrier. The spacings between, and the lengths of, the upper edges 3 and 5, 5 and 7, and so on of the merlons are different. Both the spacings and the lengths are determined by the information stored in the tracks. Thus, the tracks are spatially frequency modulated along the lengths thereof. The heights 4, 6 and so on of the merlons are equal to one another and to about one quarter wavelength of the radiation by means of which the record carrier is read. Thus a beam of radiation striking the edge of a merlon will be reflected partially from the upper surface and partially from the lower surface. Because of the path length difference the part reflected from the upper surface will be in phase opposition with the part reflected from the lower surface, producing destructive interference. The optical structure need not have straight perpendicular walls, but the upper and lower edges may smoothly join one another.

According to the invention the optical structure is coated with an additional layer 10 of an electrically conducting material in order to enable the position of the plane of the optical structure to be readily detected during the reading of the record carrier. The thickness of the layer 10 is a fractional part, for example 1/10, of the height of the merlons and may, for example, be 150 A.U. Such a layer may be deposited from vapour on the structure which has been pressed into the carrier. The layer preferably consists of a metal, for example aluminium, so as to obtain a highly reflecting structure.

Figure 3:
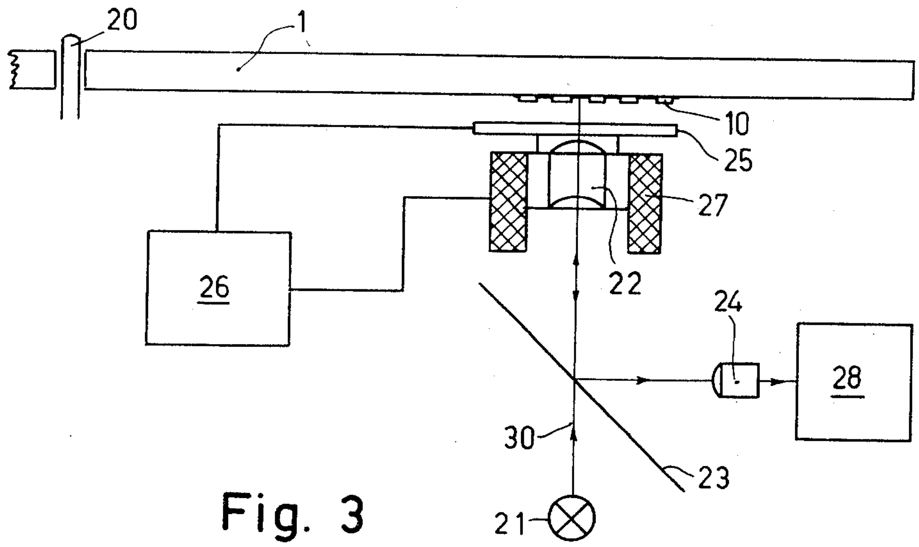
FIG. 3 shows an embodiment of a read apparatus according to the invention.

When the disk record shown in FIG. 1 is to be read it is rotated at a speed, of, for example, 1,500 revolutions per minute by means of a driving spindle 20 shown in FIG. 3. This Figure is a radial sectional view of the record carrier. A read beam 30, which is emitted by a source of radiation 21 and only one ray of which is shown for simplicity, reaches the record carrier via a half-silvered mirror 23. The read beam is focussed to a small spot of radiation, of the order of magnitude of the smallest detail in the optical structure, on the record carrier by an objective system 22. When the carrier is rotated the radiation beam reflected at the record carrier is modulated in time in accordance with the sequence of the merlons in the track to be read. This modulated beam is reflected to a radiation-sensitive detector 24 by the half-silvered mirror 23. At the output of the detector an electric signal which corresponds to the information recorded in the record carrier is produced. The detector 24 may be connected to known electronic means 28 for converting the electric output signal from the detector into picture and sound.

Figure 2:
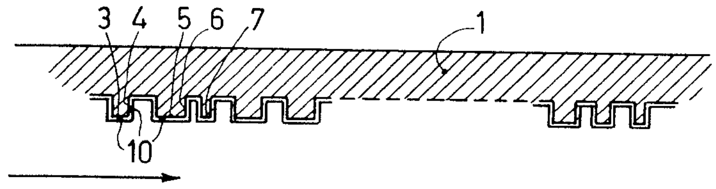
FIG. 2 is a cross-sectional view of a record carrier according to the invention.

To enable the read beam to be always focussed on the track to be read provisions must be made for detecting the distance by which the plane of the track and the objective system are spaced from one another. For this purpose, according to the invention, a plate 25 made of an electrically conducting radiation-transmitting material is secured to the objective system. This plate is disposed opposite the electrically conductive layer 10 of the record carrier, which owing to its large capacitance may be regarded as connected to ground, and forms a capacitor with it. The value of this capacitor is determined by the spacing between the electric conductors 10 and 25. The surface area of the plate 25 is many times greater than the dimensions of the elements of the optical structure, so that the capacitance value of the capacitive element is determined by the distance by which a plane which extends parallel to the carrier at one half of the height of the merlons shown in FIG. 2 is spaced from the plate 25.

It is known to determine the value of a capacitor by including it in a frequency modulator so that the variation in frequency of the output signal is determined by the capacitance variation. By applying the output signal of the modulator to a frequency demodulator a signal is obtained the amplitude of which is proportional to the capacitance value of the capacitor.

The objective system must be capable of displacement over a comparatively large range. Hence the capacitance value of the capacitive element may vary over a large range. The frequency of a signal supplied by an oscillator cannot readily be varied over a large range. Furthermore, with a varying oscillator frequency the output impedance of the demodulator cannot simply be maintained constant. Moreover, the varying capacitance influences the Q-factor of the oscillator. Therefore according to the invention the capacitance value is determined by means of the arrangement shown in FIG. 4.

In this Figure $O_s$ represents an oscillator which delivers a fixed-frequency signal. This signal is applied to secondary windings $L_2$ and $L_3$ of a transformer the primary $L_1$ of which forms part of the resonant circuit. The transformer is also loosely coupled inductively to the oscillator $O_s$. The capacitance value to be measured is represented by $C_1$. When the objective and hence the plate 25 are spaced from the optical structure by the desired distance, $C_1$ has its nominal value. The circuit $L_1C_1$ then has a natural frequency such that at the output of a circuit arrangement comprising diodes $D_1$ and $D_2$, capacitors $C_4$ and $C_5$ and resistors $R_5$ and $R_6$ a control signal of value O appears. At too small a value of $C_1$, which means that the objective is excessively spaced from the optical structure of the record carrier, the output signal is, say, positive. This output signal is applied via a power amplifier, not shown, to, for example, a loudspeaker coil (27 in FIG. 3) in which the objective 22 is suspended. As a result the objective is moved towards the record carrier. When, however, the objective is too close to the optical structure of the record carrier, which corresponds to too high a value of $C_1$, the output signal is, say, negative and the objective is moved away from the record carrier.

The elements $C_1$, $L_1$, $L_2$, $L_3$, $D_1$, $D_2$, $C_4$, $C_5$, $R_5$ and $R_6$ therefore operate as an FM detector having a natural frequency that varies with the distance between the record and the opposed capacitor plate 25. The detector is thus a passive detector having a frequency response depending on the distance between the record and the capacitor plate 25.

This arrangement is used to ensure that, when the record carrier is placed in the read apparatus and this apparatus is switched on, the objective and the plate are spaced by a safe distance from the optical structure, so that the optical structure cannot be damaged.

Figure 4:
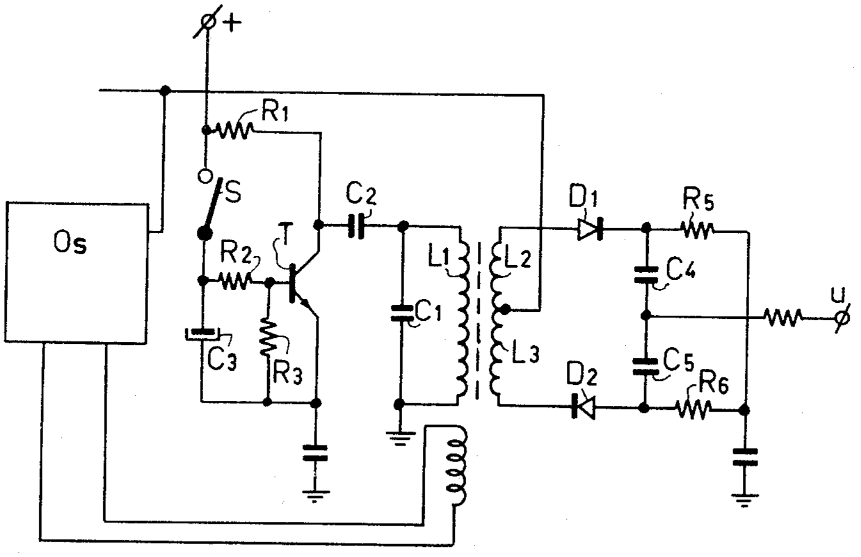
FIG. 4 shows, partly in schematic form and partly in detail, the electronic device according to the invention for producing the control signal.

For this purpose the arrangement shown in FIG. 4 includes a switch S, which may be a mechanical switch and is closed when there is no record carrier in the read apparatus. When the read apparatus is connected to a supply source a capacitor $C_3$ is charged in a very short time, so that a transistor T is highly conducting. In this condition a capacitor $C_2$ is included in the resonant circuit. As a result, the overall capacitance of the circuit is considerably greater than the nominal value, and the objective is spaced from the record carrier by a comparatively large distance. When the record carrier is placed in the read apparatus a capacitor $C_1$ is connected in the circuit in parallel with the capacitor $C_2$.

In a practical embodiment of an apparatus according to the invention the nominal value of $C_1$ was 22 pF, as was $C_2$.

In the arrangement shown in FIG. 4 care is further taken to ensure that once the record carrier has been placed in position the overall capacitance of the resonant circuit is determined by $C_1$ only. To prevent the delivery of a large control signal, which may give rise to hunting with the consequent likelihood of the plate striking the optical structure, according to the invention the series capacitance of $C_2$ and the effective collector capacitance of the transistor T are gradually reduced.

Placing a record carrier in the read apparatus causes the switch S to be opened. Consequently the capacitor $C_3$ is discharged via resistors $R_2$ and $R_3$. The base voltage of the transistor and hence its effective collector capacitance are gradually reduced. When the transistor has eventually become non-conducting, the latter capacitance and hence the capacitance of the series combination have dropped to a very low value of, for example, 1 pF. Thus the overall capacitance of the resonant circuit is determined substantially exclusively by $C_1$ which now has about its nominal value.

As an alternative, instead of including an additional capacitor in the resonant circuit the value of which is gradually reduced, when the read apparatus is switched on and the record carrier is placed in position in it the frequency of the oscillator may be caused to slowly vary from a value at which the objective system is spaced from the optical structure by a large distance to a fixed value. The small variations of the spacing between the objective system and the record carrier around the nominal value are measured with the frequency of the oscillator fixed.

There may be connected — in parallel with the capacitance to be measured — a variable capacitive element by means of which, at the beginning of the reading of a record carrier, the nominal spacing between the objective system and the optical structure may be adjusted. This capacitive element, which may, for example, be a variable diode, may manually be adjusted by an operator in accordance with the picture displayed by the read apparatus. Alternatively automatic adjustment is possible, in which case the modulation depth of the output signal from the detector (24 in FIG. 3) serves as a criterion.

What is claimed is:

1. Apparatus for reading a disk-shaped radiation-reflecting record carrier on which information is recorded in at least one track having an optical structure, the record carrier being coated with an electrically conducting and optically reflecting layer, the apparatus comprising a radiation source for supplying a read beam, a radiation-sensitive detector for converting the read beam modulated by the record carrier into an electric signal, an objective system for forming an image of the part of the record carrier to be read on the detector, a plate made of an electrically conductive material being secured to the objective system and serving to form, together with the electrically conducting coating of the record carrier, a capacitive element with a capacitance depending on the distance between the objective and the record carrier, a fixed frequency oscillator, a passive frequency detection circuit connected to said capacitance element and having a natural frequency depending on said capacitive element, means for applying the output of the fixed frequency oscillator to the frequency detection circuit, and means connected to the frequency detection circuit for controlling the position of the objective system relative to the optical structure of the record carrier, the fixed frequency of said oscillator corresponding to the natural frequency of said frequency detection circuit when said record is at a desired distance from said objective.

2. Apparatus as claimed in claim 1 wherein the capacitive element is shunted by a variable capacitive element by means of which the distance by which during reading the objective system and the optical structure of the record carrier are to be spaced can be adjusted.

3. Apparatus as claimed in claim 1, wherein the objective system is suspended in a loudspeaker coil to which the output signal from the electronic arrangement is applied.

4. Apparatus as claimed in claim 1, wherein the electronic device contains means responsive to the placement of the record carrier in the read apparatus, for maintaining the objective system spaced from the optical structure of the record carrier by a distance which is large compared with the distance desired during reading.

5. Apparatus as claimed in claim 4, wherein the electronic device contains means for gradually reducing the said distance to about the distance desired during reading.

6. Apparatus as claimed in claim 4, wherein a series combination of a capacitor and the effective collector capacitance of a transistor is connected in the resonant circuit in parallel with the capacitive element, the base electrode of the transistor being connected to one terminal of a supply source via a charging capacitor and to the other terminal of said source via a switch.

* * * * *